United States Patent
Redman

(10) Patent No.: US 6,526,900 B2
(45) Date of Patent: Mar. 4, 2003

(54) AMPHIBIOUS VEHICLE HAVING AN INFLATABLE PONTOON

(75) Inventor: Donald R. Redman, Ormond Beach, FL (US)

(73) Assignee: Trolley Boat LLC, Holly Hill, FL (US)

( * ) Notice: Subject to any disclaimer, the term of this patent is extended or adjusted under 35 U.S.C. 154(b) by 0 days.

(21) Appl. No.: 09/917,020

(22) Filed: Jul. 27, 2001

(65) Prior Publication Data

US 2002/0025734 A1 Feb. 28, 2002

Related U.S. Application Data

(60) Provisional application No. 60/221,427, filed on Jul. 28, 2000.

(51) Int. Cl.⁷ .............................................. B63B 43/10
(52) U.S. Cl. ......................................... 114/68; 114/123
(58) Field of Search ............................ 114/68, 69, 123, 114/61.1, 344; 440/12.5

(56) References Cited

U.S. PATENT DOCUMENTS

| | | | |
|---|---|---|---|
| 1,133,629 A | * 3/1915 | Foster | ........................ 114/123 |
| 4,459,932 A | 7/1984 | Hildebrand | |
| 4,621,385 A | 11/1986 | Gillois | |
| 4,669,408 A | 6/1987 | Schad | |
| 4,802,433 A | 2/1989 | Kovac | |
| 4,864,961 A | * 9/1989 | Slonski | ...................... 114/360 |
| 5,113,779 A | * 5/1992 | Amrein et al. | ................ 114/68 |
| 5,150,662 A | * 9/1992 | Boyd et al. | .................... 114/68 |
| 5,203,274 A | 4/1993 | Hart et al. | |
| 5,315,950 A | 5/1994 | Abel | |
| 5,687,669 A | 11/1997 | Engler | |
| 5,727,494 A | 3/1998 | Caserta et al. | |
| 5,868,093 A | 2/1999 | Tseng | |
| 5,875,730 A | 3/1999 | Erceg | |

\* cited by examiner

*Primary Examiner*—Stephen Avila
(74) *Attorney, Agent, or Firm*—Norman A. Nixon; Beusse Brownlee Bowdoin & Wolter, P.A.

(57) ABSTRACT

An amphibious vehicle having inflatable pontoons disposed in recesses formed in the vehicle body. The inflatable pontoons retract into the recesses when deflated to reduce the overall width of the vehicle to below the maximum allowable width for a road vehicle. The inflatable pontoons extend when inflated to beyond the maximum allowable width for road vehicles, thereby improving the stability of the vehicle when it is operated in water. The inside surfaces of the recesses provide support for transferring the uplift force generated by the pontoons to the vehicle body when in water. An elastic member may be used to retract the deflated pontoons into the recess. Decorative doors covering the recesses are forced open by the inflating pontoons to a position above the water line.

15 Claims, 4 Drawing Sheets

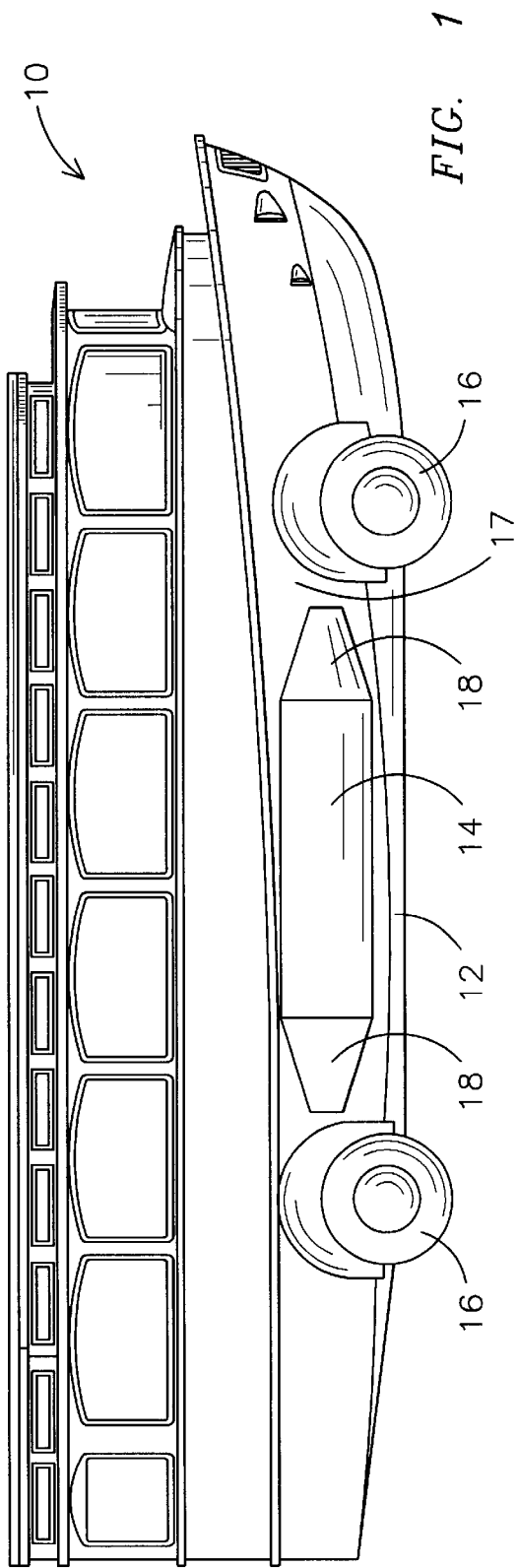
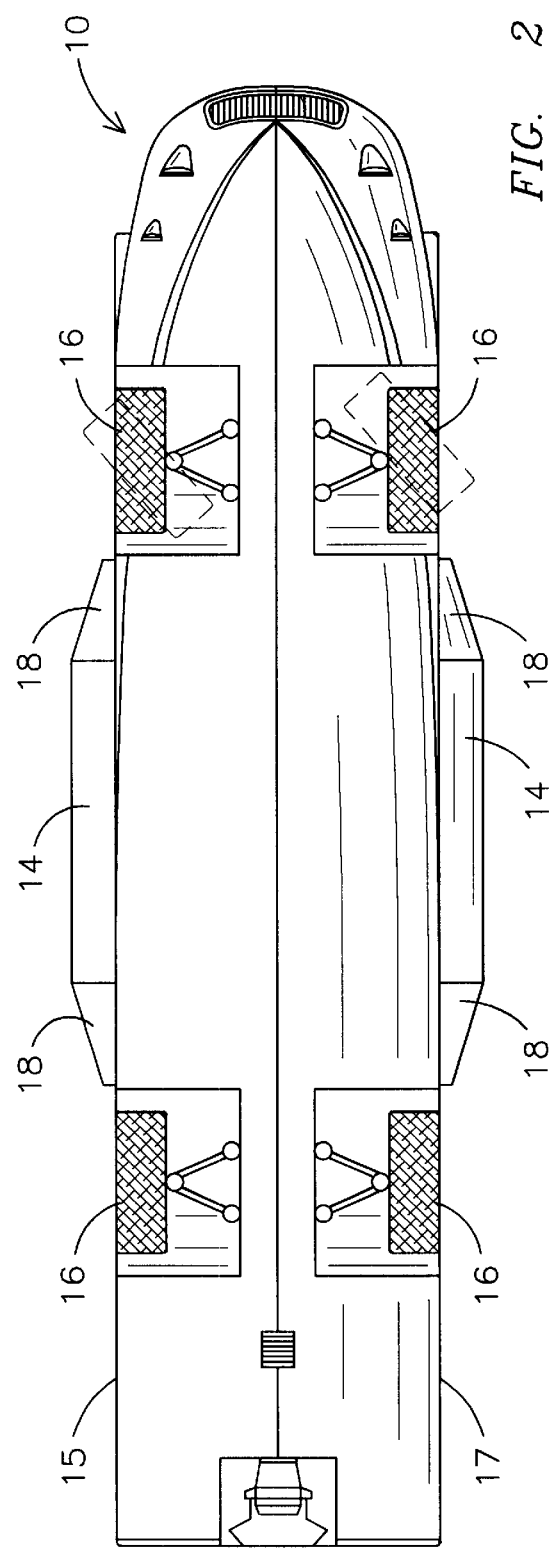

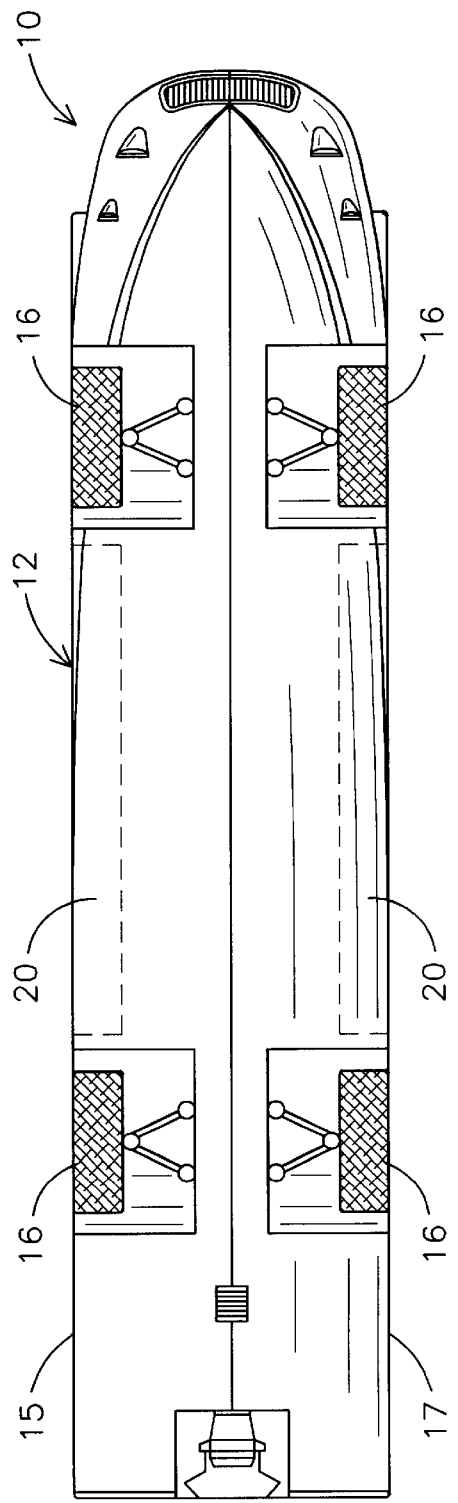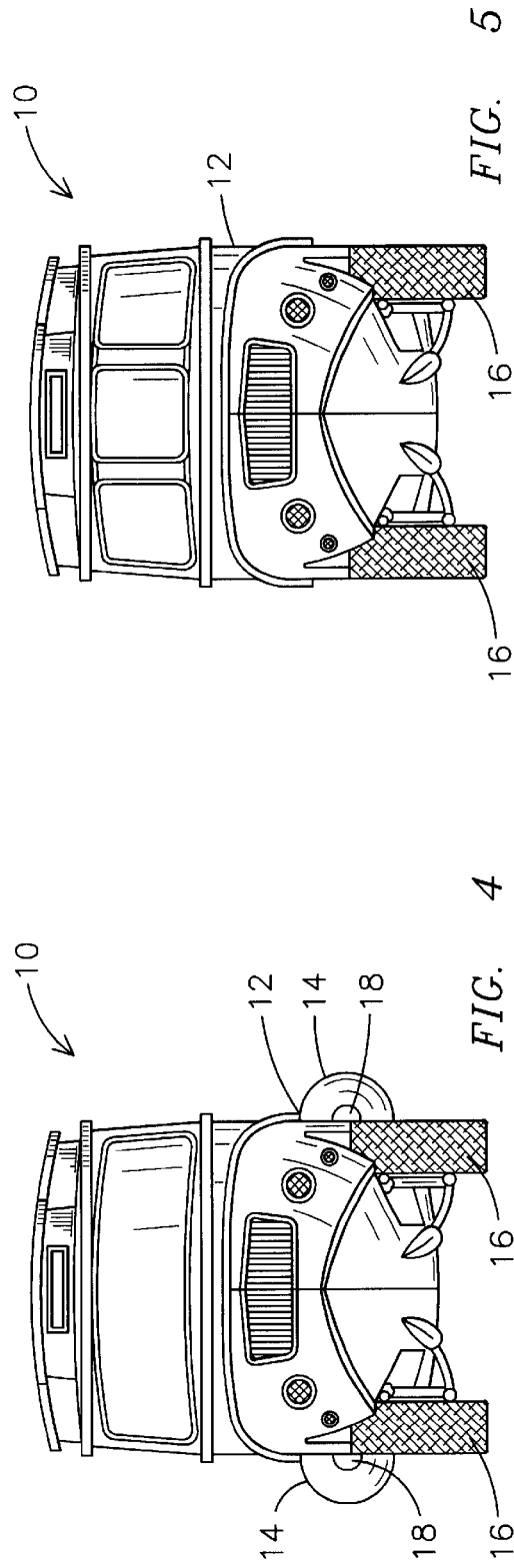

AMPHIBIOUS VEHICLE HAVING AN INFLATABLE PONTOON

This application claims benefit of U.S. provisional patent application No. 60/221,427, filed on Jul. 28, 2000.

FIELD OF THE INVENTION

This invention relates to an amphibious vehicle capable of operation on land and in the water.

BACKGROUND OF THE INVENTION

Amphibious vehicles adopting pontoons and other means for floatation and stability in the water, as well as inflatable pontoons adapted for use with various water borne structures, are known in the prior art. Prior art amphibious vehicles are generally designed to ride low in the water to inhibit capsizing. Such vehicles are typically operated at low speeds as further precaution against excessive rolling or capsizing. Other prior art vehicles, such as work boats that are not amphibious, have floatation elements which are permanently inflated. Such flotation elements extend outwardly by moveable arms for additional stability during periods of stationary work. This particular design is not well suited for use with an amphibious vehicle because the mechanism securing the floatation elements may fail due to the loads resulting from waves and vehicle movement.

Various means are employed in the prior art for floatation of amphibious vehicles. U.S. Pat. No. 5,868,093 discloses an amphibious vehicle having disposed within its body cavity a plurality of hollow cells for floatation. Buoyancy tanks that articulate between an operative and inoperative position by piston and cylinder means are disclosed in U.S. Pat. No. 5,315,950. In the inoperative position the tanks are disposed parallel to one another above the roof of the vehicle. Similarly, U.S. Pat. No. 4,802,433 discloses an amphibious vehicle having pontoons that articulate between a position for water travel and a storage position for road travel, which is on top of the vehicle. Both the '950 and '433 patents pertain to recreational vehicles that presumably make use of federal, state and local highways, roads and streets. Thus, the design of these vehicles makes it necessary to employ fairly elaborate mechanisms to stow the pontoons in a position that complies with vehicle width restrictions imposed by the various governmental bodies responsible for those pathways. U.S. Pat. No. 5,687,669 discloses a vehicle employing pontoon assemblies pivotally coupled to a vehicle's frame so that the pontoons may be stowed within the width of the frame for highway, road and street use. Wheels are disposed on each pontoon assembly for land use.

Float means are disclosed by U.S. Pat. No. 5,727,494 for a cockpit body. The float means may be a plurality of retractable pontoons, or of a plurality of longitudinally extending hulls integrally formed within the vehicle. Such float means keep the vehicle afloat and provide stability during marine operation. U.S. Pat. No. 4,459,932 discloses an amphibious vehicle employing inflatable members disposed in the front, rear and one side of the vehicle, with another inflatable element directly beneath the chassis adapted to serve as a float for the vehicle. Resilient traction elements are also disclosed that are disposed inside and around the inflatable elements. Also in the prior art, a buoyant boat hull having substantially horizontal cylinder recesses along its sides for receiving a pair of helical augers is disclosed by U.S. Pat. No. 5,203,274. These recesses are specially adapted to confine water between the screw threads and project it directly to the rear of the vehicle for more efficient forward thrust.

Another prior art invention disclosed in U.S. Pat. No. 5,875,730 discloses a device for attaching inflatable pontoons to rigid keels. An elongated, substantially arcuate member conforming substantially to the circumference of a pontoon is affixed to a rigid keel. The member is preferably made of a weldable metal such as aluminum and is welded to the keel for receiving the pontoon.

SUMMARY OF THE INVENTION

The present invention is an amphibious vehicle having inflatable pontoons adapted for use as a passenger vehicle on both land and in water. The vehicle may be used, for example, for transporting tourists in areas where the touring route includes travel over land and in the water for the passengers' optimal viewing and educational enjoyment. As such, it is important for the vehicle to make quick transitions between land and water to minimize delay, which reduces the risk of passenger discontent from having to wait for an operator to make mechanical or other adjustments to the vehicle that passengers may view as being unreasonably lengthy.

The present invention is adapted for use on public highways, roads and streets by ensuring that the vehicle complies with vehicle width restrictions for use on these venues. For use in the water, the vehicle employs inflatable pontoons that operate with minimal delay and which extend the width of the vehicle while in the water to provide greater vehicle stability to reduce the risk of excessive rolling or capsizing. In one embodiment of the present invention, the vehicle includes one or more pontoons disposed in a substantially horizontal configuration along each side of the vehicle's main body. The pontoons are securely disposed within recessed cavities formed within the main body so that when they are deflated they may be withdrawn within each cavity so that the width of the vehicle complies with vehicle width restrictions for use on highways, roads and streets. In one embodiment of the present invention, the means for securing a pontoon within a recessed cavity includes a fastening means, such as Velcro, a clamping means such as clamps or bolts affixed to the main body along the upper and lower edges of the cavity that grasp center seam flaps extending longitudinally along the exterior of the pontoon, and a substantially elastic member or members that are affixed to the main body and extend around the exterior of the pontoon. The substantially elastic member not only helps to secure the pontoon within the recessed cavity, but due to its elastic properties, it also ensures the pontoon is fully withdrawn within the confines of the cavity when the pontoon is deflated to prevent the pontoon from drooping downwardly. The elastic member stretches outward when the inflatable pontoon expands and contracts when the inflatable pontoon is deflated to pull the inflatable pontoon within the recessed cavity. It also provides protection for the pontoon against external physical damage. With the pontoon secured within the cavity, a hinged decorative door may be closed to cover the pontoon for aesthetic purposes and to protect it from damage due to weathering. Further, the decorative door may be pushed up out of the water by the inflatable pontoon when the inflatable pontoon is inflated and will close over the inflatable pontoon when deflated by means of a spring loaded hinge. Alternatively, the door may be opened and closed manually.

The inflatable pontoons of the present invention may be cylindrical tubes which may be of varying diameters and lengths depending on the design of the vehicle and conditions within which the vehicle will be used. In one embodiment of the present invention, the pontoons are disposed on each side of the vehicle between the front and rear wheels. This placement provides optimum stability for the vehicle shown in the FIGS. while the vehicle is in the water. Other placements may be employed as a function of vehicle design and operational requirements. The pontoons are inflated and deflated by means of conventional air generators such as pressurized air tanks or blowers. The air generators are connected to piping having valves and pressure regulators to fill each pontoon to the desired pressure, which is typically done just prior to the vehicle entering the water. The air generators are also used to deflate the pontoons for use on land by switching or reversing the position of valves. Multiple volumes of inflatable pontoons and multiple air supplies may be provided for safety to prevent sinking in the event of a component failure. Each pontoon may also include a plurality of internal chambers to prevent total deflation of a pontoon in the event of damage. In one embodiment of the present invention, each pontoon has four discrete internal chambers that are air tight so that if one deflates the others will not. Further, the ends of each pontoon may be tapered to facilitate movement of the vehicle through the water with reduced water friction.

BRIEF DESCRIPTION OF THE DRAWINGS

The features and advantages of the present invention will become apparent from the following detailed description of the invention when read with the accompanying drawings in which:

FIG. 1 illustrates a side view of an amphibious vehicle having an inflatable pontoon disposed within one of its sides.

FIG. 2 illustrates a top view of an amphibious vehicle having inflatable pontoons in their inflated state disposed within each of its sides.

FIG. 3 illustrates a top view of an amphibious vehicle having inflatable pontoons in their deflated state disposed within each of its sides.

FIG. 4 illustrates a front view of an amphibious vehicle having inflatable pontoons in their inflated state disposed within each of its sides.

FIG. 5 illustrates a front view of an amphibious vehicle having inflatable pontoons in their deflated state disposed within each of its sides.

DETAILED DESCRIPTION OF THE INVENTION

Figure 6:
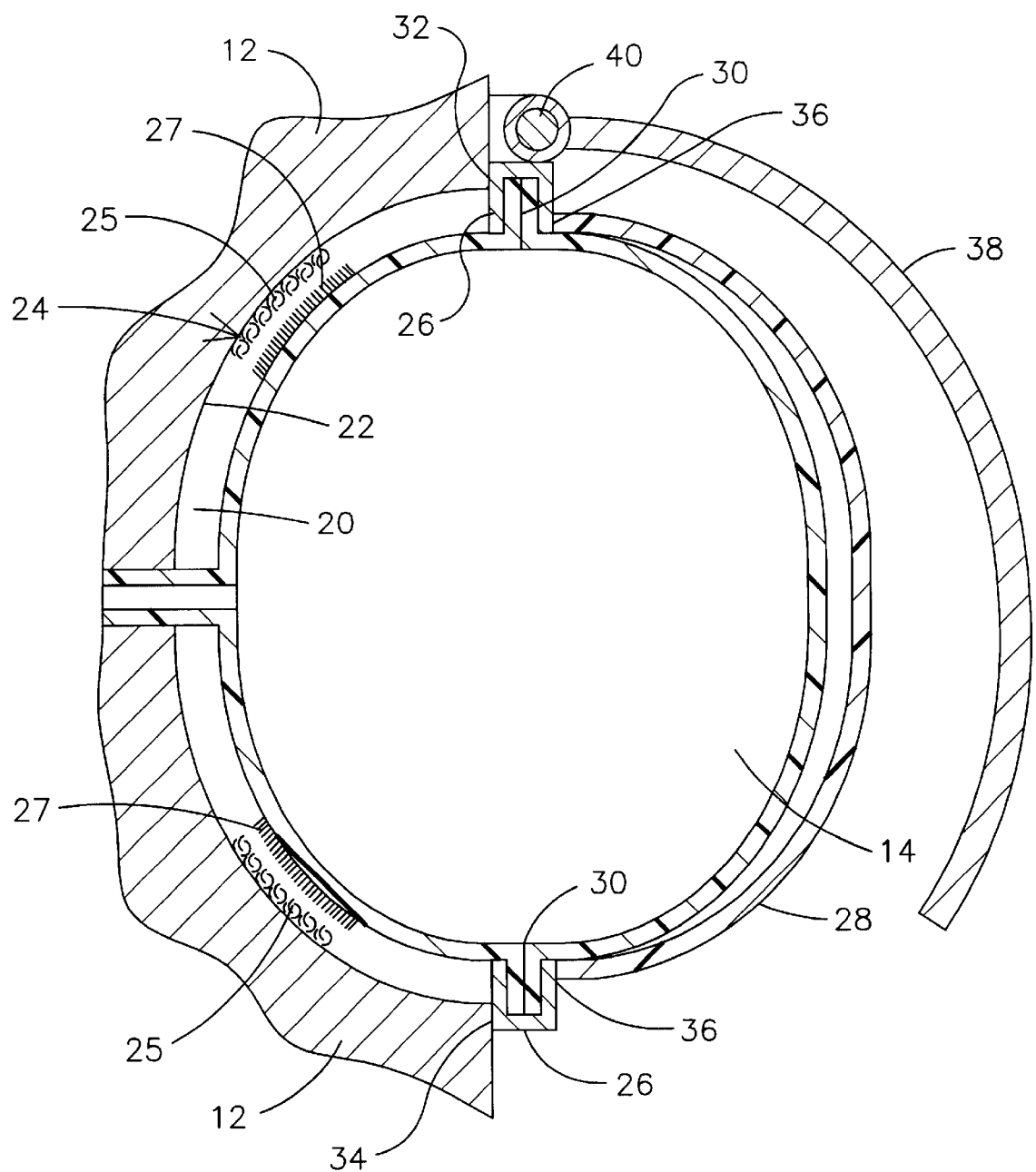
FIG. 6 illustrates a cross section of an inflatable pontoon in its inflated state disposed within a recessed cavity, means for securing the pontoon within the cavity, and a decorative door for covering the pontoon in its deflated state.

FIG. 1 illustrates an amphibious vehicle 10 having a main body portion 12 and an inflatable member used for at least partial floating support of the vehicle 10 when it is operated in water. The inflatable member illustrated in FIG. 1 is inflatable pontoon 14, although one skilled in the art can appreciate that the inflatable member may take other shapes, sizes and locations on the vehicle. Inflatable pontoon 14 is horizontally disposed between wheels 16. Amphibious vehicle 10 employs conventional means known in the art for making it water tight, providing locomotive power and a drive train, as well as necessary electrical systems, and steering mechanisms. Vehicle 10 also includes means for inflating and deflating the pontoons 14, as will be described more fully below. Inflatable pontoon 14 is constructed of material known in the art, such as rubber, suitable for a high number of inflation and deflation cycles and sufficiently durable to withstand impact loads typically encountered during use in the water. In one embodiment, both ends 18 of inflatable pontoon 14 are tapered to facilitate movement through water with reduced water friction. Alternatively, only one end 18 may be tapered, preferably the end toward the front of the vehicle, or neither may be tapered.

FIG. 2 illustrates a top view of vehicle 10 having one inflatable pontoon 14 disposed in each of a first side 15 and a second side 17 of the main body portion 12. In this figure, inflatable pontoons 14 are shown in their fully inflated position. In one embodiment, the total width of vehicle 10 is 132 inches when inflatable pontoons 14 are in their fully inflated state. This maximum width is selected to provide a high level of stability to vehicle 10 when maneuvering in the water. In alternative embodiments, vehicle 10 may be configured for widths greater or lesser than 132 inches as a function of vehicle design and operational requirements.

FIG. 3 illustrates a top view of amphibious vehicle 10 having inflatable pontoons 14 in their deflated state and retracted within the main body portion 12 so the vehicle 10 complies with any relevant statutory vehicle width restriction for use on highways, 10 roads and streets. In one embodiment in compliance with current Federal Department of Transportation regulations, vehicle 10 is less than or equal to 102 inches in total width. Alternatively, vehicle 10 may be adapted to conform to other width restrictions, including other statutory limitations as may be applied from time to time. Importantly, the overall width of the vehicle with the pontoon 14 in its deflated condition is less than the maximum width of the vehicle with the pontoon 14 inflated. Thus the inflated pontoon 14 extends for additional stability in the water when inflated and retracts to facilitate operation on dry land when deflated.

FIG. 4 illustrates a front view of amphibious vehicle 10 having inflatable pontoon 14 having a tapered end 18 disposed in each side of the main body portion 12. FIG. 5 illustrates a front view of vehicle 10 with inflatable pontoons 14 in their deflated state and retracted within main body portion 12.

FIG. 6 illustrates a cross section of main body portion 12 having an inflatable pontoon 14 disposed within a recessed cavity 20 formed within main body portion 12. In one embodiment, recessed cavity 20 is defined by a substantially arcuate inner surface 22 that spans at least a portion of the length of inflatable pontoon 14 and has a substantially constant radius of curvature. In another embodiment, the end portions of recessed cavity 20, not shown, may be tapered to conform to the tapered ends 18 of inflatable pontoons 14. The arcuate inner surface 22 serves to capture the pontoon 14 when the main body portion 12 is immersed in water, thereby transferring the uplift force created by the buoyancy of the pontoon 14 to the body portion 12. The inner surface 22 may be included from a horizontal axis at its top most end so that any upward force exerted by pontoon 14 tends to force the pontoon 14 into the depth of the recess 20. By capturing the pontoon 14 within the recessed cavity 20, the mechanical connection between these components can be greatly simplified and of much lighter weight than prior art arm-like connections. Because there will be forces applied to and by the pontoon 14 in all directions, there remains a need for a supplemental means for securing the pontoon 14 within the cavity 20. The means for securing inflatable pontoon 14 within recessed cavity 20 may include a fastening means 24 such as Velcro®, or other suitable hook and loop type fasteners, or temporary adhesives, a clamping means such as a plurality of clamps 26, or other suitable devices such as bolts, and/or an elastic member 28. Fastening means 24 may span all or substantially all of the length of recessed cavity 20 and inflatable pontoon 14 or it may be a series of segments disposed apart at predetermined distances depending on the operational requirements of amphibious vehicle 10 and loads anticipated to be received by inflatable pontoons 14 due to water impact. A first portion 25 of fastening means 24 is affixed to the inner surface 22 of recessed cavity 20 and a corresponding second portion 27 of fastening means 24 is affixed to the outer surface of inflatable pontoon 14 so that when inflatable pontoon 14 is received by recessed cavity 20 the first portion 25 and second portion 27 adhere to each other. Clamps 26 are securely affixed to main body portion 12 and are adapted to receive flaps 30 that form the center seams of inflatable pontoons 14, which span their length in one embodiment. Flaps 30 may be seamlessly integrated as part of inflatable pontoons 14 by conventional means such as an extrusion process known in the art. Clamps 26 are disposed along the upper 32 and lower 34 edges of recessed cavity 20 at predetermined distances depending on the operational requirements of amphibious vehicle 10 and loads anticipated to be received by inflatable pontoons 14 due to water impact. Elastic member 28 is made of material known in the art suitable for a high volume of inflation and deflation cycles and sufficiently durable to withstand water and debris impact loads typically encountered during use in the water. In one embodiment, elastic member 28 may be a series of straps disposed along the length of recessed cavity 20 or in another embodiment it may span the entire length of recessed cavity 20 and inflatable pontoons 14. At least one end 36 of each elastic member 28 is detachably affixed by conventional means to main body portion 12 so that easy access may be gained to inflatable pontoons 14 and recessed cavity 20 and so that elastic member 28 may be repaired or replaced.

Each recessed cavity 20 is adapted to receive the inflated pontoon so that the pontoon abuts snugly against the inner surface 22. This relationship provides a very strong interface capability between the pontoon and the main body of the vehicle, which minimizes displacement of the pontoon resulting from wave and impact loads. It also promotes the dissipation of such loads across the main body rather than such loads being absorbed almost entirely by a pontoon attachment mechanism. In one embodiment of the present invention, the inner surface of each cavity forms at least a semi-circle that is at least equal to one-half the circumference of the pontoon being received, with the pontoon being approximately 30 inches in diameter and at least one-half of it being contained within the recessed cavity 20. The inner surface 22 is disposed at least in part above the inflatable pontoon 14 for receiving the uplift force created by the buoyancy of the pontoon when the amphibious vehicle is operated in water. This relationship provides the structural support needed for the pontoons to remain attached to the main body while under extreme upward pressure. The recessed cavity feature of the present invention provides a significant advantage over prior art configurations that have pontoons extended away from the main body of a vehicle by rigid support means and those that have pontoons affixed directly to the exterior of the vehicle. Those configurations result in the pontoons absorbing a higher degree of wave impact loads than those received by the configuration of the present invention, which make those prior art designs more susceptible to mechanical damage. This feature also provides the capability for the vehicle to quickly vary its width for transitioning between land use and water use. As the pontoon 14 is inflated, it grows in size horizontally, thereby increasing the width of the vehicle 10 to perhaps a size greater than the legal limit for use on highways. Accordingly, the present invention not only provides a mechanically secure apparatus for attaching an inflatable pontoon 14 to an amphibious vehicle 10, but also provides a method for increasing the width of the vehicle to increase its waterborne stability to a width that is greater than a width that is permitted for highway vehicle operation.

FIG. 6 also illustrates a decorative door 38 that is pivotally attached by hinge 40 to main body portion 12 so that decorative door 38 may be opened when inflatable pontoons 14 are in their inflated state and closed when they are in their deflated state to provide a decorative cover over them and to protect them from damage due to weathering and other causes. Decorative door 38 may be moved simply by the pressure exerted against it by pontoon 14, or it may be separately powered or manually moved. The door 38 is moved above a waterline of the vehicle 10 by the inflatable pontoon 14 when it is in the inflated condition to avoid additional drag as the vehicle is propelled through the water.

Figure 7:
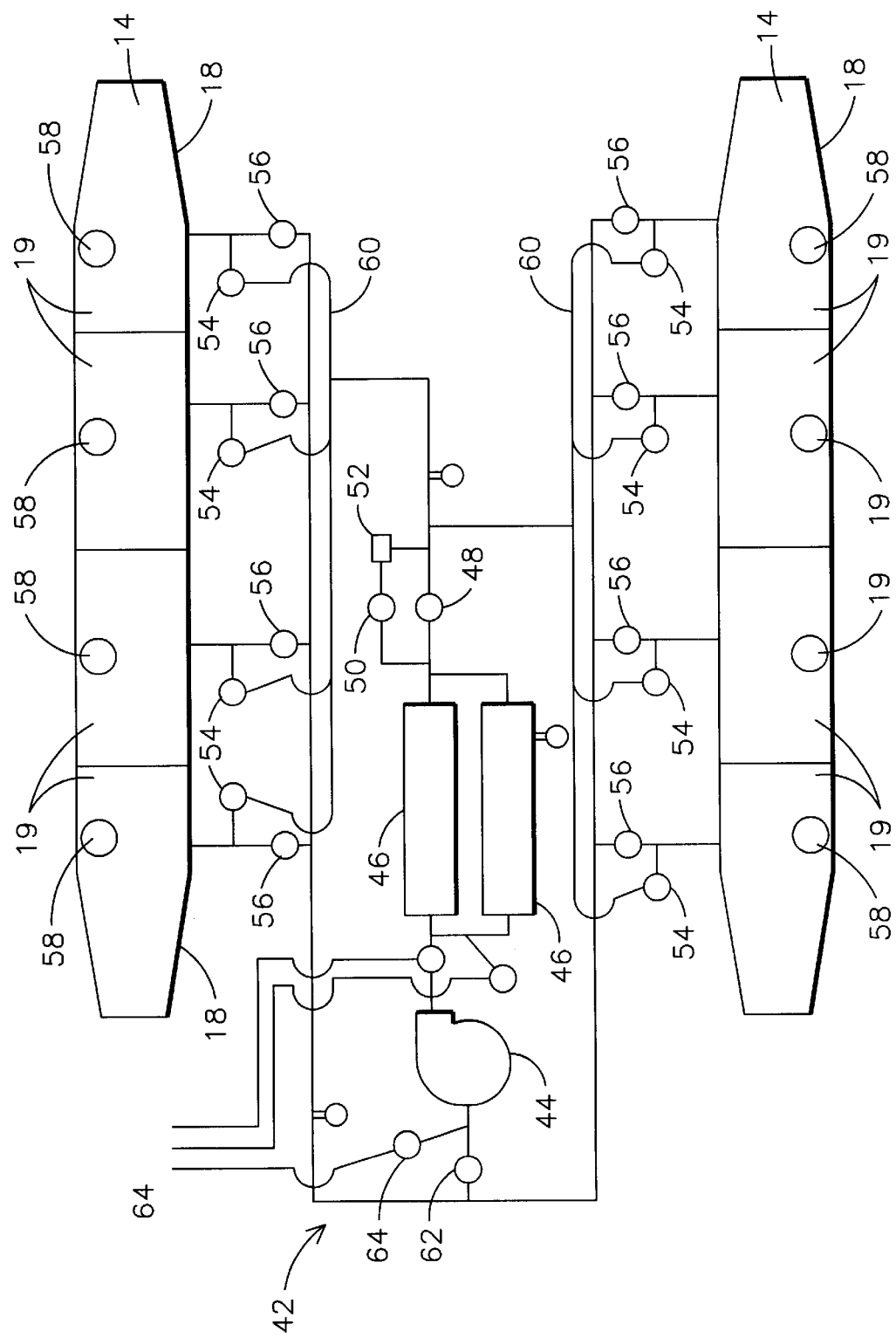
FIG. 7 illustrates a schematic representation of air generators and valves providing for the inflation and deflation of the pontoons.

FIG. 7 illustrates a schematic representation of a means 42 for supplying air to and withdrawing air from the inflatable pontoons 14 for inflation and deflation. It also illustrates one embodiment of the present invention where four internal chambers 19 are integral to inflatable pontoons 14. Other embodiments may include more or less internal chambers 19 as a function of vehicle design and operational requirements. Compressed air is supplied by compressor 44 through receivers 46 to each respective chamber 19 via high pressure inflation valve 48 or via low pressure inflation valve 50 through pressure reducer 52. The compressed air may be provided directly from the compressor 44 without the benefit of accumulation in the receivers 46, although the inflation time may be increased. Individual chamber inflation valves 54 and deflation valves 56 are provided. Relief valves 58 may be provided for each chamber 19, either attached directly to the pressure chamber 19 or at an appropriate location within the associated piping 60. Exhaust from the chambers 19 may be provided to the intake of the compressor 44 through valve 62 or may be vented directly to atmosphere 64. Valve 62, compressor 44, valves 56 and other associated piping and valves form a means for returning compressed gas from the inflatable pontoons 14 to the receivers 46, thereby reducing the need to draw atmospheric gas into the system 42, and increasing the response time of the system for rapid inflation and deflation of the chambers 19. Compressor 44 may also draw atmospheric air through valve 64. A control system (not shown) is provided to control the operation of these various components to achieve a high degree of control over the inflation and deflation of the inflatable pontoons 14 for rapid deployment/withdrawal and for safe, redundant operation.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. An amphibious vehicle comprising:
   a main body portion;
   at least one recessed cavity formed in the main body portion;
   at least one inflatable pontoon disposed in the at least one recessed cavity;
   wherein the at least one recessed cavity is defined by a substantially arcuate inner surface for receiving the at least one inflatable pontoon, the inner surface being disposed at least in part above the at least one inflatable pontoon for receiving an uplift force when the amphibious vehicle is operated in water;
   wherein the means for securing the at least one inflatable pontoon comprises an elastic member; and
   wherein the elastic member has a first end and a second end, the first end and second end being affixed to the main body portion such that the elastic member extends around the exterior of the inflatable pontoon.

2. An amphibious vehicle comprising,
   a main body portion;
   at least one recessed cavity formed in the main body portion;
   at least one:inflatable pontoon disposed in the at least one recessed cavity;
   means for securing the at least one inflatable pontoon within the at least one recessed cavity when the at least one inflatable pontoon is in a deflated state;
   wherein the at least one recessed cavity is defined by a substantially arcuate inner surface for receiving the at least one inflatable pontoon, the inner surface being disposed at least in part above the at least one inflatable pontoon for receiving an uplift force when the amphibious vehicle is operated in water; and
   wherein the means for securing the at least one inflatable pontoon comprises a clamp affixed to the main body portion within the recessed cavity, and a flap extending along an exterior surface of the at least one inflatable pontoon, wherein the clamp is adapted to receive and secure the flap.

3. The amphibious vehicle of claim 2 wherein the at least one inflatable pontoon contains a plurality of chambers.

4. The amphibious vehicle of claim 2 wherein the at least one inflatable pontoon comprises a cylindrical tube having a tapered end.

5. The amphibious vehicle of claim 2, further comprising a door pivotally attached to a hinge attached to the main body portion.

6. The amphibious vehicle of claim 2, wherein a maximum width of the main body portion is less than or equal to 102 inches when the at least one inflatable pontoon is in a deflated state.

7. The amphibious vehicle of claim 6, wherein a maximum width of the main a body portion is greater than 102 inches when the at least one inflatable pontoon is in an inflated state.

8. An amphibious vehicle comprising:
   a body portion;
   an inflatable member attached to the body portion;
   an inflation apparatus for selectively inflating and deflating the inflatable member;
   wherein the inflatable member extends beyond the body portion when in an inflated condition to provide the amphibious vehicle a maximum width, and contracts when in a deflated condition to provide the amphibious vehicle a width less than the maximum width;
   wherein the inflatable member is disposed in a recess formed in the body portion and extends beyond the recess when in the inflated condition; and
   further comprising a door pivotally attached to the body portion for covering the recess when the inflatable member is in the deflated condition wherein the door is moved to a position above a waterline by the inflatable member when it is in the inflated condition.

9. The amphibious vehicle of claim 8, wherein the recess comprises an inner surface at least partially disposed above the inflatable member to receive an uplift force from the inflatable member when the amphibious vehicle is in water.

10. The amphibious vehicle of claim 8, further comprising an elastic member attached to the inflatable member for withdrawing the inflatable member within the recess when in the deflated condition.

11. An amphibious vehicle comprising:
    a body portion;
    a first inflatable pontoon disposed in a first recessed cavity formed in the body portion on a first side of the body portion, wherein the first recessed cavity is defined by a substantially arcuate inner surface for receiving the first inflatable pontoon, the inner surface being disposed at least in part above the first inflatable pontoon for receiving an uplift force when the amphibious vehicle is operated in water;
    means for securing the first inflatable pontoon within the first recessed cavity when the first inflatable pontoon is in a deflated state, the means for securing comprising a clamp affixed to the body portion within the first recessed cavity, and a flap extending along an exterior surface of the first inflatable pontoon, wherein the clamp is adapted to receive and secure the flap;

a second inflatable pontoon attached to the body portion on a second side of the body portion opposed the first side;

an inflation apparatus for selectively inflating and deflating the first and the second inflatable pontoons;

wherein each of the first and the second inflatable pontoons are disposed in a respective recess formed in the body portion when in a deflated condition and extend beyond the respective recess when in an inflated condition.

12. The amphibious vehicle of claim 11, wherein a maximum width of the amphibious vehicle is less than or equal to a maximum width for operation of the vehicle on a roadway when the first and second inflatable pontoons are in the deflated condition, and wherein the first and second inflatable pontoons extend beyond the maximum width when in the inflated condition.

13. The amphibious vehicle of claim 11, wherein the inflation apparatus comprises a receiver for containing a volume of compressed gas for inflation of at least one of the first and the second inflatable pontoon.

14. The amphibious vehicle of claim 13, wherein the inflation apparatus comprises a means for returning compressed gas from at least one of the first and the second inflatable pontoon to the receiver.

15. An amphibious vehicle comprising:

body portion;

an inflatable member attached to the body portion in a recessed cavity, the recessed cavity defined by a substantially arcuate inner surface for receiving the inflatable member, the inner surface being disposed at least in part above the inflatable member for receiving an uplift force when the amphibious vehicle is operated in water;

means for securing the inflatable member within the recessed cavity when the inflatable member is in a deflated state, the means for securing comprising a clamp affixed to the body portion within the recessed cavity, and a flap extending along an exterior surface of the inflatable, wherein the clamp is adapted to receive and secure the flap;

an inflation apparatus for selectively inflating and deflating the inflatable member;

wherein the inflatable member extends beyond the body portion when in an inflated condition to provide the amphibious vehicle a maximum width, and contracts when in a deflated condition to provide the amphibious vehicle a width less than the maximum width.

* * * * *